United States Patent
Flanagan et al.

(10) Patent No.: US 9,188,229 B2
(45) Date of Patent: Nov. 17, 2015

(54) GLAND PACKING YARN

(75) Inventors: Stephen Gerard Flanagan, Quincy, MA (US); Philip Michael Mahoney, Jr., Roslindale, MA (US); Paul Vincent Starbile, Woburn, MA (US)

(73) Assignee: A.W. CHESTERTON COMPANY, Woburn, MA (US)

( * ) Notice: Subject to any disclaimer, the term of this patent is extended or adjusted under 35 U.S.C. 154(b) by 387 days.

(21) Appl. No.: 12/613,979

(22) Filed: Nov. 6, 2009

(65) Prior Publication Data
US 2011/0111223 A1   May 12, 2011

(51) Int. Cl.
*D02G 3/22* (2006.01)
*F16J 15/22* (2006.01)

(52) U.S. Cl.
CPC ............ *F16J 15/22* (2013.01); *Y10T 428/2915* (2015.01)

(58) Field of Classification Search
CPC ........... D02G 3/06; D02G 3/22; D02G 3/442; D07B 2201/2084; D07B 2201/2088
USPC ......... 442/164, 180, 239, 243, 268, 286, 289; 428/365, 377, 397, 401
See application file for complete search history.

(56) References Cited

U.S. PATENT DOCUMENTS

| | | | |
|---|---|---|---|
| 1,976,982 A * | 10/1934 | Bux .......................... 139/384 R |
| 3,616,148 A | 10/1971 | Edelman | |
| 4,559,862 A | 12/1985 | Case et al. | |
| 4,998,419 A * | 3/1991 | Moore ............................... 66/25 |
| 5,225,262 A | 7/1993 | Leduc | |
| 5,549,306 A | 8/1996 | Ueda | |
| 5,590,420 A * | 1/1997 | Gunn ................... 2/69 |
| 5,802,828 A | 9/1998 | Adorno | |
| 6,270,083 B1 | 8/2001 | Hirschvogel et al. | |
| 6,896,580 B2 * | 5/2005 | Falla et al. ...................... 450/41 |
| 6,916,967 B2 * | 7/2005 | Wright et al. ................... 602/42 |
| 2004/0239046 A1 | 12/2004 | Kosack et al. | |
| 2007/0021023 A1 | 1/2007 | Altman et al. | |

FOREIGN PATENT DOCUMENTS

| | | |
|---|---|---|
| JP | 9-508444 | 8/1997 |
| JP | 2004-100880 | 4/2004 |
| JP | 2004-232806 | 8/2004 |

OTHER PUBLICATIONS

International Search Report for Application No. PCT/US2010/055654, 1 page, dated Jan. 11, 2011.
Japanese Office Action for Application No. 2012-538034, 5 pages, dated Jun. 3, 2014.
Chinese Office Action for Application No. 201080050058.7, 17 pages, dated Mar. 11, 2014.

* cited by examiner

*Primary Examiner* — Andrew Piziali
(74) *Attorney, Agent, or Firm* — Nelson Mulllins Riley & Scarborough LLP; Anthony A. Laurentano (57) ABSTRACT

The present invention provides a packing yarn that utilizes a non-metal woven reinforcement that provides lateral as well as longitudinal strength while improving the wear characteristics of the yarn material. To increase the support provided by the woven reinforcement, the yarn material and woven reinforcement are folded together such that the woven reinforcement is substantially coextensive with the yarn material in the resulting packing yarn.

11 Claims, 14 Drawing Sheets

GLAND PACKING YARN

BACKGROUND OF THE INVENTION

The present invention concerns packing yarns. More specifically, the present invention concerns a composite yarn having a reinforcement layer.

Packing yarns are used in the manufacture of seals, and in particular, in the packing of a stuffing box used to seal pumps and valve shafts. One conventional packing yarn is commonly formed by using an expanded film or tape using a mixture of Polytetrafluoroethylene (PTFE) and graphite and folding it into a yarn. Yarns may be formed of films, substrates, tapes, and other materials. Yarns may be expanded or not expanded, may be extruded or not extruded, and may be sintered or unsintered.

In some cases a liquid lubricant may be used to aid in the manufacturing process and/or provide increased thermal conductivity. This material exhibits good thermal and wear characteristics. One issue with this mixture is that these materials have poor tensile strength and tend to extrude easily through clearances in the stuffing box. To improve the tensile strength of the yarn, reinforcement is incorporated into the yarn. Conventional reinforced materials resist extrusion better and can handle higher pressure applications. A significant drawback of conventional materials is that they are still highly prone to extrusion and breakage during normal operation.

SUMMARY OF THE INVENTION

In view of the above, it is beneficial to provide a yarn that has improved wear and strength characteristics without the drawbacks inherent in using conventional reinforced material. The present invention utilizes a reinforcement, such as a woven reinforcement, that provides lateral as well as longitudinal strength while improving the wear characteristics of the yarn material. The woven reinforcement may be metal or non-metal, depending on the application. A non-metal woven material may be useful, for example, to avoid damaging a seal used in conjunction with the yarn. A metal material, for example, brass, may also be used. A metal material may be appropriate for certain high-pressure applications.

The yarn material and woven reinforcement are folded together to form the packing yarn. When folded, the woven reinforcement may be substantially coextensive with the material in the resulting packing yarn.

The present invention maintains tensile strength in both longitudinal and lateral directions, even when one or more filaments break.

BRIEF DESCRIPTION OF THE FIGURES

These and other characteristics of the present invention will be more fully understood by reference to the following detailed description in conjunction with the attached drawings, in which.

DETAILED DESCRIPTION

The present invention provides a packing yarn that utilizes a non-metal woven reinforcement layer that provides both longitudinal and lateral (e.g. multi-dimensional) support to the packing yarn while maintaining the flexibility of the yarn. A reinforcement layer is stacked on a first layer of material and the resulting combination is folded together. In certain embodiments, when folded together, the reinforcement layer is substantially co-extensive with the material of the first layer that forms the outer surface of the yarn. The reinforcement layer can be formed of a non-metal woven material, although other materials apparent to one skilled in the art can also be employed. In addition to the strength provided by the reinforcement layer, the non-metal woven nature of the reinforcement is less damaging to seal elements if the material of the first layer wears away during use. For applications requiring high pressure resistance a metal woven material can be used as the reinforcing material.

As used herein, the term "non-metal" refers to materials and compounds that are not substantially made of a metal or a metal alloy. As used herein, the term "woven material" refers to a material formed by interlacing strands of one or more material types into a collective whole such as a woven fabric or mesh. As used herein, the term "substantially co-extensive" refers to the reinforcement layer extending substantially throughout the body of the yarn in support of the material of the first layer. Thus, in most instances, wherever there is material of the first layer in the body of the packing yarn, there is also material of the reinforcement layer providing support for the material of the first layer.

Woven materials are formed by weaving fibers or filaments together. A number of weave patterns will be known to those having ordinary skill in the art. In addition to traditional weave patterns employing a repeating pattern, a non-woven material can be formed from entangling fibers or filaments in a substantially random pattern or a knitted material can be formed such that the fibers or filaments are arranged at irregular or different angles to each other. In such an embodiment, the fibers or filaments may be arranged or applied, for example, by spraying. Such a material is also considered a "woven material" herein.

A knit is similar to a weave. A knitted material is formed of a series of loops called "stitches" pulled through each other. While knitted materials provide some multiaxial reinforcement, knitted materials may be too elastic in some cases for purposes of the present invention. In preferred embodiments, the woven material is a non-knitted woven material.

Moreover, in some cases non-woven materials may be used in conjunction with the present invention, provided that they afford sufficient multiaxial reinforcement. Nonwoven materials are materials that are not made by weaving or knitting, and do not require that fibers be converted to yarn. Nonwoven materials may be sheet or web structures bonded together by entangling fiber or filaments, or by perforating films. Nonwoven materials may be bonded mechanically, thermally, or chemically, or in other means known to those of ordinary skill in the art. Nonwoven materials may be flat, porous sheets made directly from separate fibers or from molten plastic or plastic film. Nonwoven materials may range in durability from single-use, limited life materials to durable fabrics. Non-woven materials may be selected for certain properties, such as absorbency, liquid repellency, resilience, stretch, softness, strength, flame retardancy, washability, cushioning, filtering, providing a bacterial barrier, and sterility.

Figure 1A:
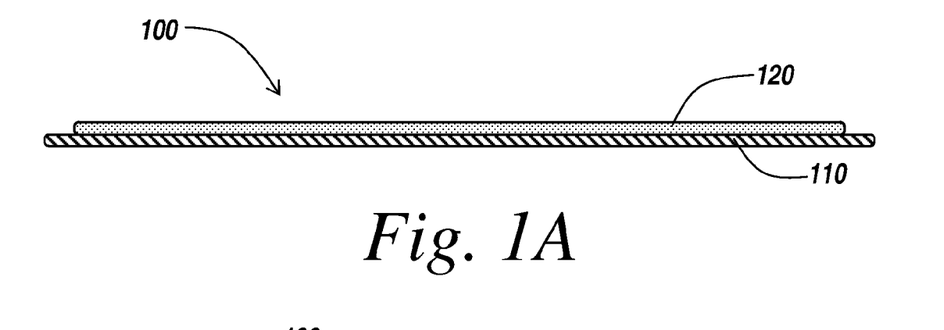
FIG. 1A is a cross-sectional view of the stacked layers that form the packing yarn of the present invention.

FIG. 1A is a cross-sectional view of the combination 100 of layers 110, 120 that form the packing yarn in accordance with one embodiment of the present invention. The combination 100 includes a first layer 110 formed of a first material. A reinforcement layer 120 formed of a non-metal woven material is stacked on the first layer 110. The combination 100 of the first layer 110 and reinforcement layer 120 are folded together to form the packing yarn.

Figure 1B:
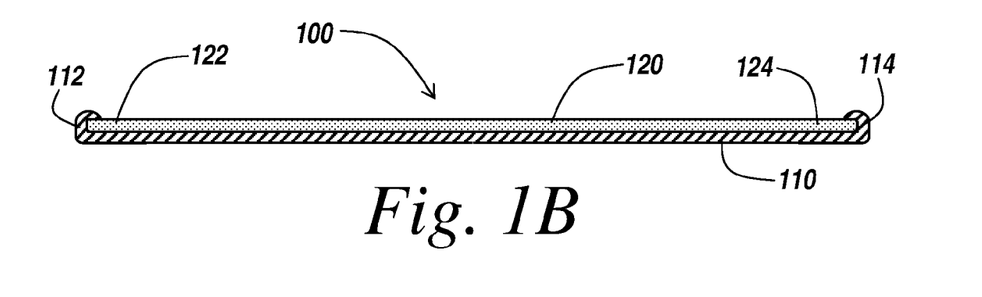
FIG. 1B is a cross-sectional view of the combination of the first yarn layer and the second reinforcement layer in a first stage of folding in accordance with the teachings of the present invention.

FIG. 1B is a cross-sectional view of the combination 100 of the first layer 110 and the reinforcement layer 120 in a first stage of folding in accordance with one embodiment of the invention. In this example, a first edge 112 and a second edge 114 of the first layer 110 have been folded over a first edge 122 and a second edge 124, respectively, of the reinforcement layer 120. This ensures that the material of the first layer 110 covers the reinforcement layer when the combination 100 has been completely folded together to form the packing yarn.

Figure 1C:
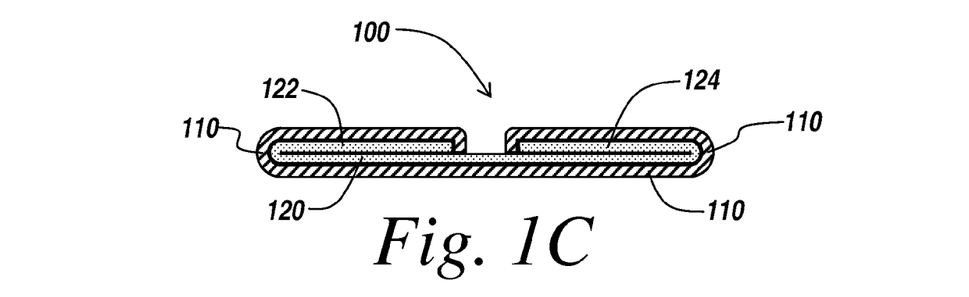
FIG. 1C is a cross-sectional view of the combination of the first yarn layer and the second reinforcement layer in a second stage of folding in accordance with the teachings of the present invention.

FIG. 1C is a cross-sectional view of the combination 100 of the first layer 110 and the reinforcement layer 120 in a second stage of folding in accordance with one embodiment of the present invention. In this example, the first edge 122 and the second edge 124 of the reinforcement layer 120 (now covered by edges 112 and 114 of the first layer 110) are folded over onto the reinforcement layer 120. This ensures that the reinforcement layer 120 is substantially co-extensive with the first layer 110 when the combination 100 has been completely folded together to form the packing yarn.

Figure 1D:
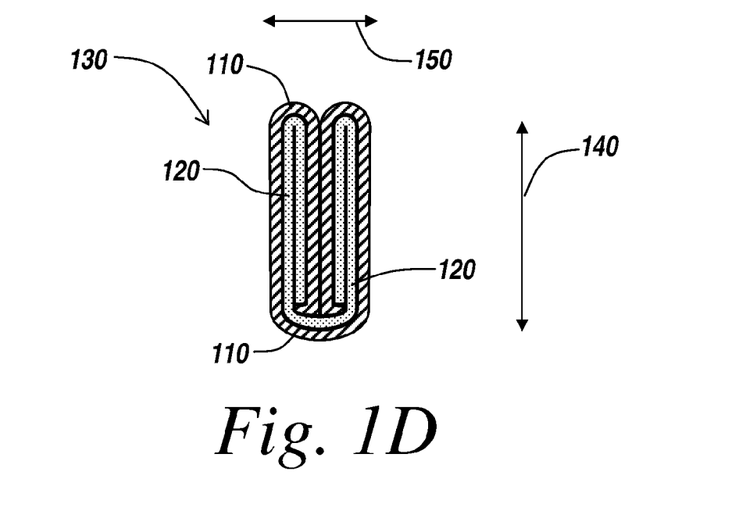
FIG. 1D is a cross-sectional view of the combination of the first yarn layer and second reinforcement layer in a third stage of folding in accordance with the teachings of the present invention.

FIG. 1D is a cross-sectional view of the combination 100 of the first layer 110 and the reinforcement layer 120 in a third stage of folding in accordance with one embodiment of the present invention. In this example, the combination 100 (with the edges 122 and 124 of the reinforcement layer 120 folded back over the reinforcement layer 120) is folded in half to form the packing yarn 130. The folding of the packing yarn 130 in this manner ensures that the reinforcement layer 120 is substantially co-extensive with the first layer 110. Thus, wherever there is material of the first layer 110, there is also material of the reinforcement layer 120 providing support. The material reinforcement layer 120 also extends not just along the length of the packing yarn 130 but also along the height 140 and width 150 of the yarn 130 as indicated by the depicted cross-section. There, the reinforcement layer provides multi-dimensional support to the first layer 110 and the resultant packing yarn.

As shown in FIGS. 1A-1D and 2, in exemplary embodiments of the present invention, the first layer 110 may totally or completely encapsulate, shield, enclose, or cover the reinforcement layer 120, thereby separating the reinforcement layer from any sealing medium or potential chemical attack.

Figure 2:
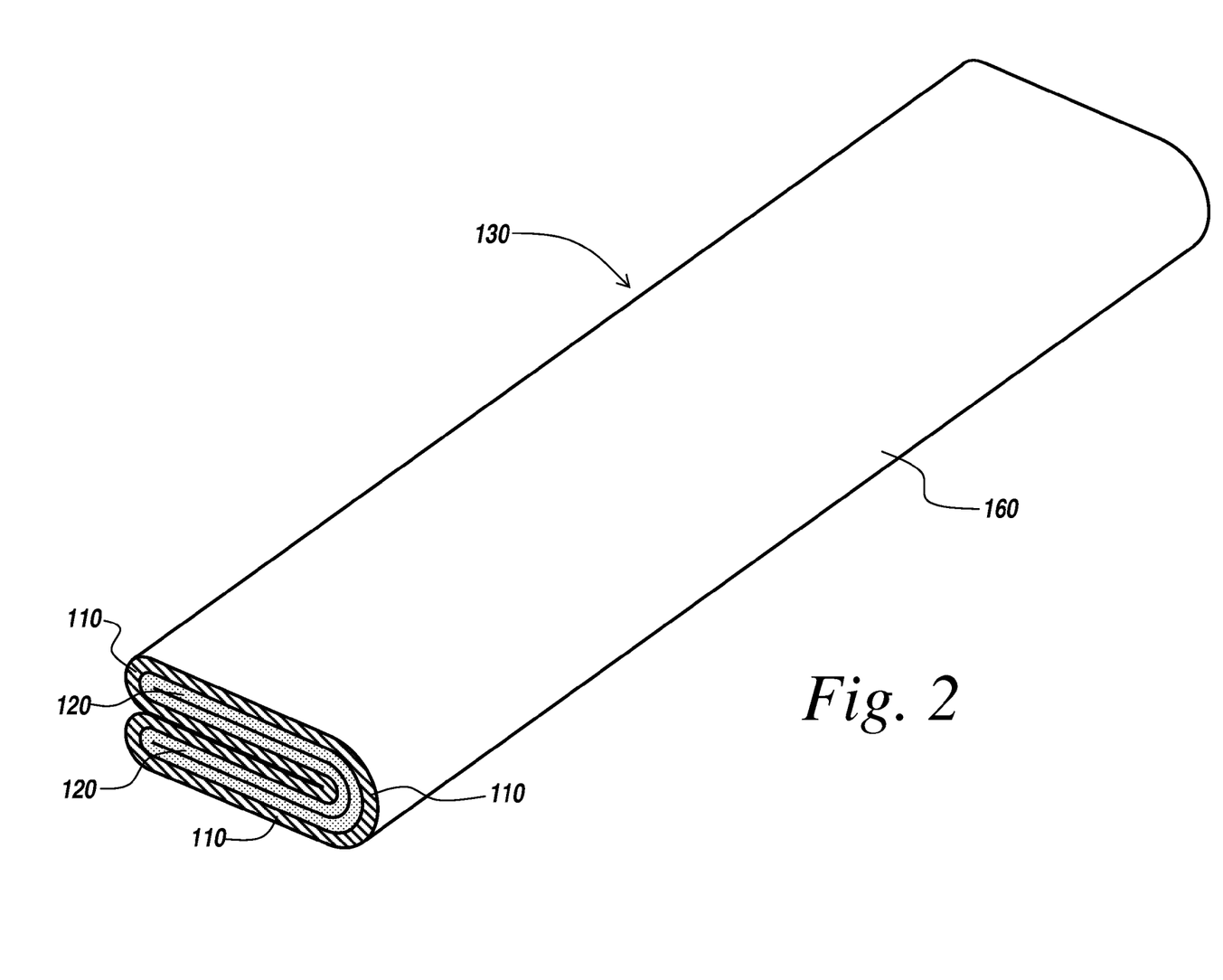
FIG. 2 is a perspective view of the packing yarn of FIG. 1D in accordance with the teachings of the present invention.

FIG. 2 is a perspective view of the packing yarn 130 resulting from the folding depicted in FIGS. 1A-1D. In this embodiment, the first layer 110 is folded around the reinforcement layer 120 and the combination of the first layer 110 and reinforcement layer 120 is folded upon itself. Thus, the outer surface 160 of the yarn 130 comprises the material of the first layer 110 supported or otherwise reinforced by the reinforcement layer 120, which is now disposed within the packing yarn 130.

Since the first layer 110 forms the outer surface 160 of the packing yarn 130, the first layer 110 is preferably formed of a material suitable for use in packing yarn applications. The type of material used may depend on the use of the packing yarn, including the conditions experienced in use such as temperature, pressure and chemical compatibility. Some examples of suitable material include, but are not limited to, graphite and Polytetrafluoroethylene (PTFE). In a preferred embodiment, the first layer 110 is formed of graphite impregnated, expanded PTFE. Such materials have good thermal conductivity, chemical resistance, and low frictional characteristics. Other possible materials will be apparent to one skilled in the art given the benefit of this disclosure.

The first layer 110 is sized and dimensioned, when folded together with the reinforcement layer 120, to result in desired dimensions for the packing yarn 130. The width of the two layers is based on the ideal width for the equipment used. The width used is then split to produce a width more conducive to folding into the finished yarn. The finished yarn has a linear density in the range of about 5,000 denier to about 25,000 denier. This range provides multiple finished sizes capable of manufacturing various sizes of Mechanical Packing. These various size yarns are then plied together to make larger denier yarns for specific applications.

The reinforcement layer 120 is also sized and dimensioned, when folded together with the first layer 110, to result in desired dimensions for the packing yarn 130. As set forth above, the first layer 110 is folded around the reinforcement layer 120. In such embodiments, the reinforcement layer 120 may, at a minimum, substantially span the width of the finished yarn and at a maximum can be the same width as first layer 110 to ensure that the reinforcement layer 120 is substantially or completely coextensive with the first layer 110 when the combination 100 of the first layer 110 and the reinforcement layer 120 are folded together to form the final packing yarn 130. Preferably, the reinforcing layer has a minimum tensile strength of about 5 lbs in the longitudinal (warp) direction and at least about 2.5 lbs in the transverse (fill) direction using ASTM D5035 as a test method.

Since one of the primary roles of the reinforcement layer 120 in the packing yarn 130 is to provide multi-dimensional strength and support for the first layer 110 of the packing yarn 130 while maintaining flexibility, the reinforcement layer 120 is preferably formed of a non-metal woven material suitable for such applications. Examples of suitable materials include, but are not limited to, fiberglass, graphite, carbon, aramids (including the various forms of aramids, such as meta-aramids and para-aramids) and other natural and manmade fibers. These materials have various impacts on the finished product such as cost, strength and chemical resistance. For applications requiring extreme pressure resistance a metal woven material can be used as the reinforcing material. Other suitable materials will be apparent to one skilled in the art given the benefit of this disclosure.

The woven material of the reinforcement layer 120 is combined with the first layer 110, to augment the properties of the material of the first layer 110 by providing strength and support. Non-metal materials are typically preferred as the use of metal can lead to metal on metal contact in the seal, although metal material can be used in certain limited applications. The packing yarn of the present invention, if it employs a metal reinforcement layer, can encapsulate the metal inside of the first layer 100 to mitigate any potential contact of the reinforcing layer 120 with the equipment. The woven material includes interlacing strands of material woven into a collective whole such as a fabric, knit or mesh. As such, it provides lateral as well as longitudinal support and strength (e.g., multi-directional or multi-dimensional) to the packing yarn 130. An example of this can be seen in FIGS. 3A and 3B.

Figure 3A:
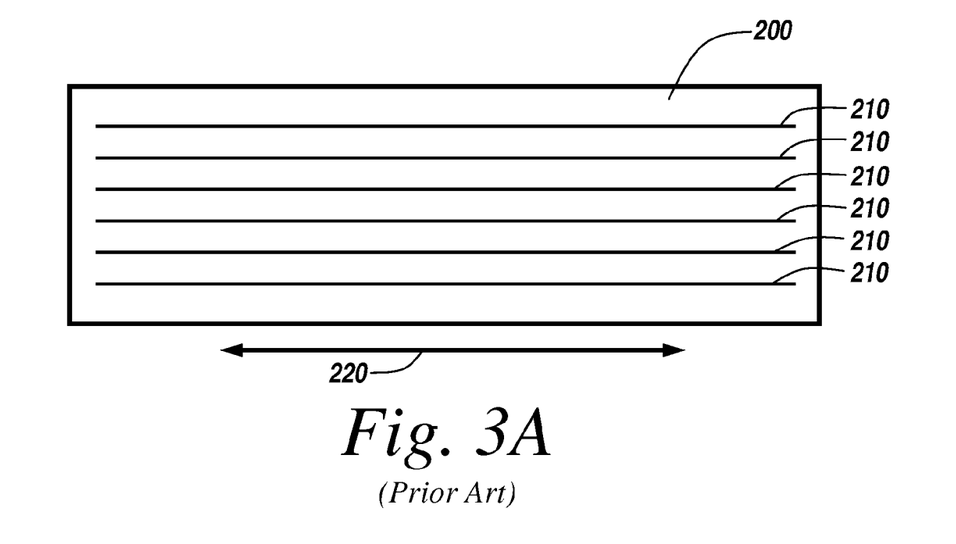
FIG. 3A is a top view of the multiple layers of a conventional longitudinally reinforced packing yarn.

FIG. 3A is top view of an example of a layer of a conventional yarn 200 that is reinforced with a series of longitudinal supports 210, such as metal filaments, that run along the longitudinal axis 220 of the yarn 200. While the longitudinal supports 210 provide increased tensile strength along axis 220, they do not laterally support the yarn along the other axis 230. Thus, this type of reinforcement only provides support and reinforcement in a single direction. Since, in use, forces may be applied to the packing yarn 200 along more than one axis or direction, such longitudinal reinforced packing yarn 200 may sheer or otherwise fail.

Figure 3B:
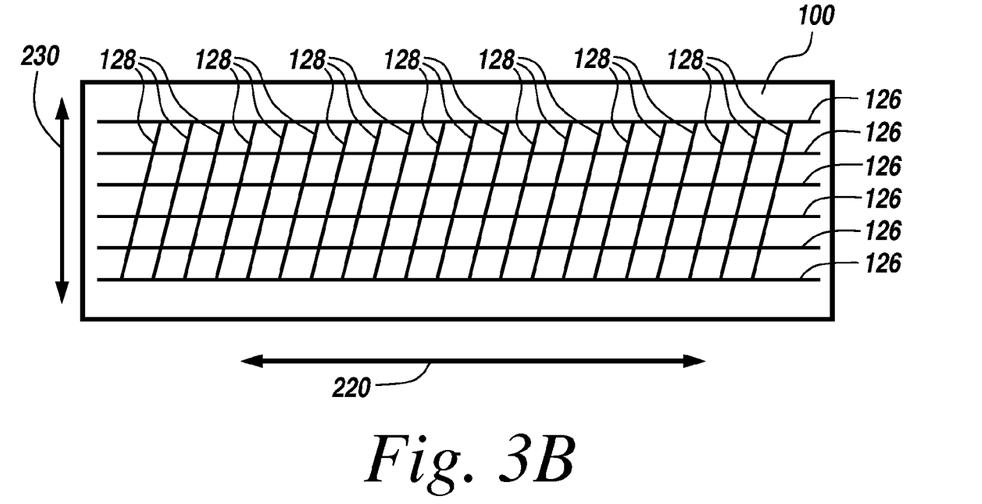
FIG. 3B is a top view of the multiple layers of the packing yarn of the present invention where the reinforcement layer is composed of a woven material in accordance with the teachings of the present invention.

FIG. 3B is a top view of the combination 100 of the first layer 110 and the second reinforcement layer 120 of the packing yarn 130 of the present invention where the reinforcement layer 120 is made of a woven material to provide multi-dimensional support. The woven material of reinforcement layer 120 includes a series of longitudinal supports 126 as well as a series of lateral supports 128 interwoven in a matrix. The longitudinal supports 126 provide increased tensile strength along the longitudinal axis 220 while the lateral supports 128 provide increased tensile strength along the lateral axis 230. The interweave into a mesh of the longitudinal 126 and lateral 128 supports further augments the strength and support provided by the reinforcement layer 120 while maintaining flexibility. Thus, the interwoven matrix of the reinforcement layer 120 provides improved resistance to forces from a number of directions as may be experienced in use while maintaining the flexibility of the packing yarn 130. In addition the reinforcement provides excellent pressure resistance to a mechanical packing.

Figure 4A:
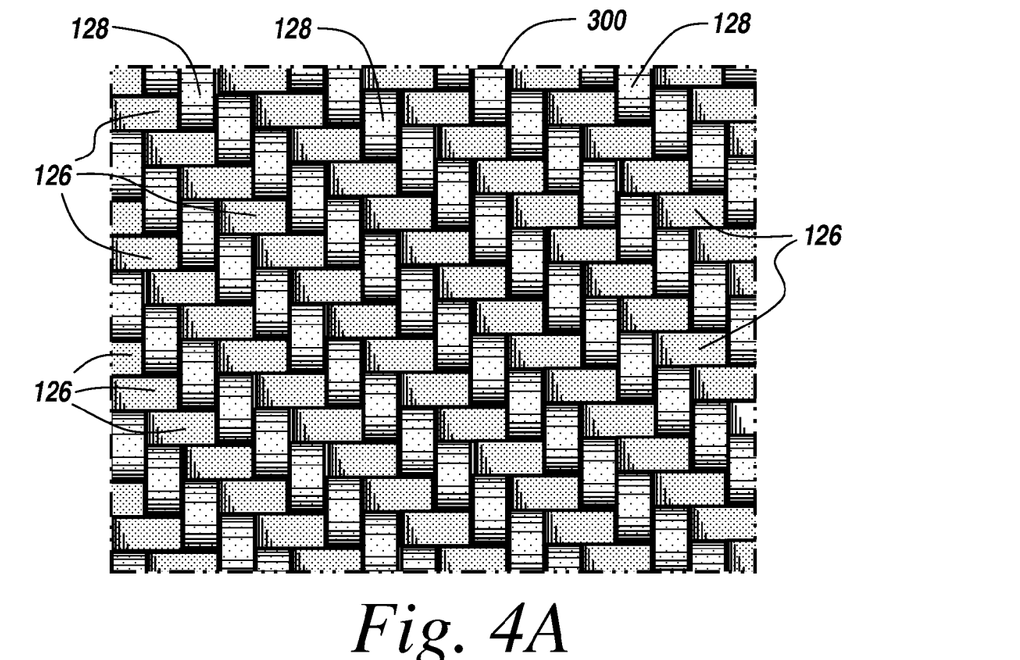
FIG. 4A is a partial exploded plan view of a weave pattern of the woven reinforcement layer of FIG. 3B in accordance with the teachings of the present invention.
Figure 4B:
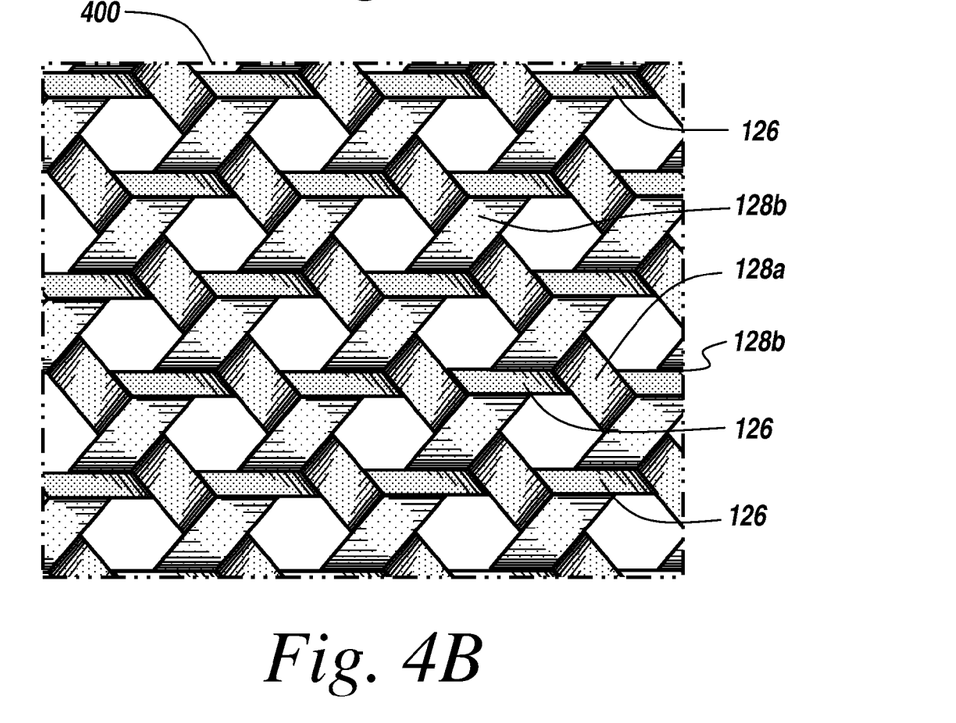
FIG. 4B is a partial exploded plan view of another weave pattern of the woven reinforcement layer of FIG. 3B in accordance with the teachings of the present invention.

As discussed above the woven material of the reinforcement layer 120 is interwoven into a mesh or fabric that provides both longitudinal and lateral support. The weave of such mesh or fabric may depend on the application. FIGS. 4A and 4B depict some possible configurations.

FIG. 4A is a partial exploded view of one embodiment of a weave pattern 300 in which the longitudinal supports 126 and lateral supports 128 are woven in a step pattern. In this example, each lateral support 128 is interwoven with every two longitudinal supports 126. Consecutive lateral supports 128 are offset (or stepped) by one longitudinal support 126. This results in the tight step pattern seen in FIG. 4A.

FIG. 4B depicts a partial exploded view of another embodiment of a weave pattern 400 having one set of longitudinal supports 126 and two sets of lateral supports 128a, 128b. In this example, the first set of lateral supports 128a is aligned at an angle offset from the lateral axis. The second set of lateral supports 128b is aligned at an angle offset from the lateral axis and opposite the angle of the first set of lateral supports 128a. The longitudinal supports 126 are woven in between the first and second sets of lateral supports 128a, 128b. This results in the hexagonal pattern seen in FIG. 4B.

Some weave patterns may be more suitable than other weave patterns for particular applications. Other possible weave patterns will be apparent to one of ordinary skill in the art given the benefit of this disclosure. Some types of weave patterns provide more strength and/or elasticity than others and weave pattern selection is done based on specific application criteria. The ultimate strength of a specific woven material is based on the base reinforcing material selected to make the weave and the pattern of the weave itself. Any type of construction that provides multiaxial tensile strength is an appropriate selection for the reinforcing material.

Figure 5:
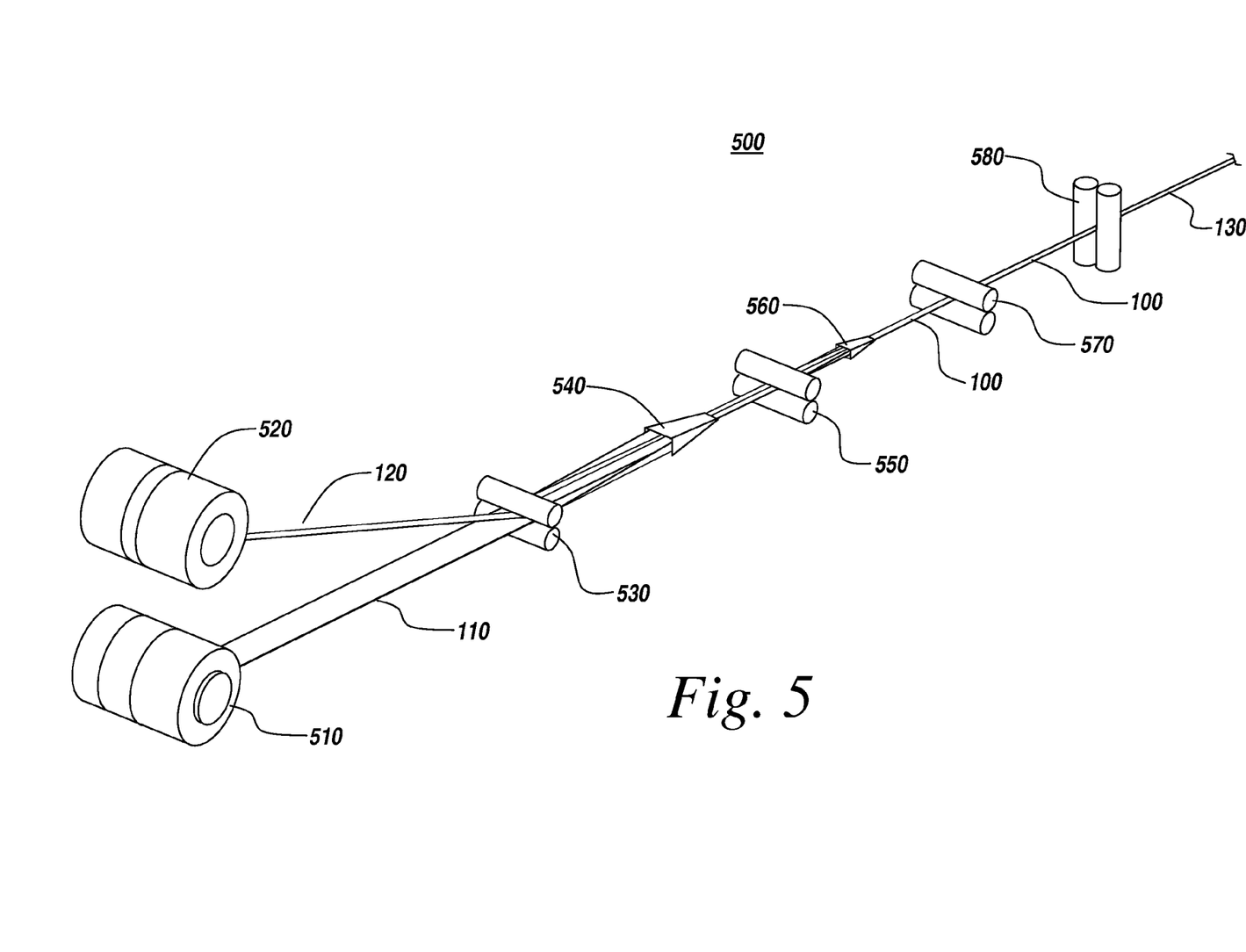
FIG. 5 is a perspective view of an exemplary mechanical folding system for making and folding the packing yarn in accordance with the teachings of the present invention.

FIG. 5 is a perspective view of an exemplary machine folding system 500 of the present invention, where the first layer 110 and a reinforcement layer 120 made of a woven material are combined and folded together to form the packing yarn 130. The first layer 110 is provided as a film or tape on a first spool 510. The woven material of the reinforcement layer 120 is provided as a ribbon on a second spool 520. The first layer 110 and reinforcement layer 120 are combined and processed through a series of pressing assemblies and folders 530, 540, 550, 560, 570, and 580 to result in the packing yarn 130. Each of these processes will be discussed in more detail below.

Figure 6:
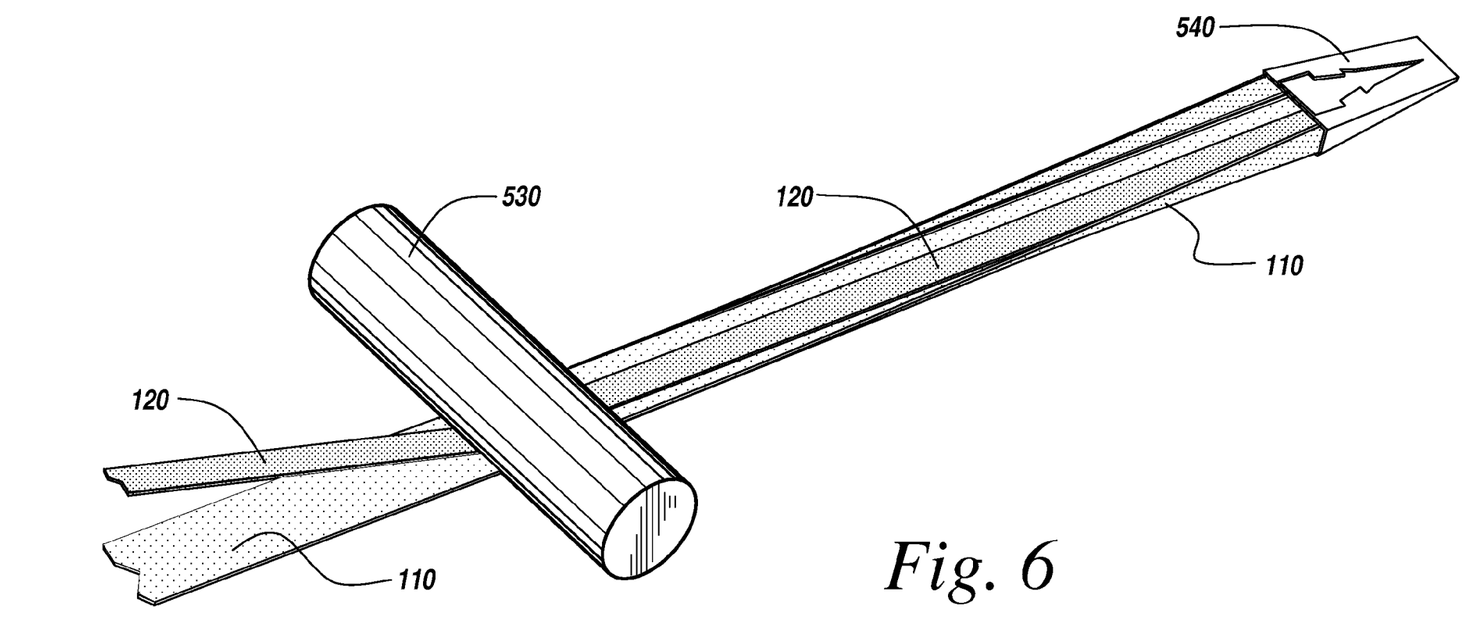
FIG. 6 is a partial perspective view of a first stage of the mechanical folding system of FIG. 5.

FIG. 6 is a partial perspective view of the non-metal woven material of the reinforcement layer 120 being stacked on the first layer 110 and passed through a first pressing assembly 530 and onto a first folder 540 of the mechanical folding system 500 of FIG. 5. The first pressing assembly 530 serves to press together the first layer 110 and the reinforcement layer 120. In this example, only the top roller of the first pressing assembly 530 is shown. In certain embodiments, an adhesive, epoxy, or other joining agent may be used to couple together the first layer 110 and the woven material of the reinforcement layer 120. In other embodiments, the act of pressing the first layer 110 and the reinforcement layer 120 together, such as provided by the first pressing assembly 530, serves to combine the reinforcement layer 120 to the first layer 110 as the woven texture of the reinforcement layer 120 is slightly embedded into the first layer 110. At this stage, the combination 100 has a cross-section as depicted in FIG. 1A.

Once the first layer 110 and the reinforcement layer 120 have been pressed together, the combination 100 of the first layer 110 and the reinforcement layer 120 are passed to the first folder 540. In this example, the width of the first layer 110 is greater than the width of the reinforcement layer 120. As such, the first folder 540 serves to fold the first edge 112 and the second edge 114 of the first layer 110 over the first edge 122 and the second edge 124 of the reinforcement layer 120. The first folder 540 is depicted in FIG. 6 as a triangular head open at both sides. Although not depicted herein, the folders used in conjunction with exemplary embodiments of the present invention may also include projections or guides at the end that receives the combination 100 of the first layer 110 and the reinforcement layer 120 in order to guide the folding process. An example of the first folder 540 folding the first edge 112 and the second edge 114 can be seen in FIG. 7.

Figure 7:
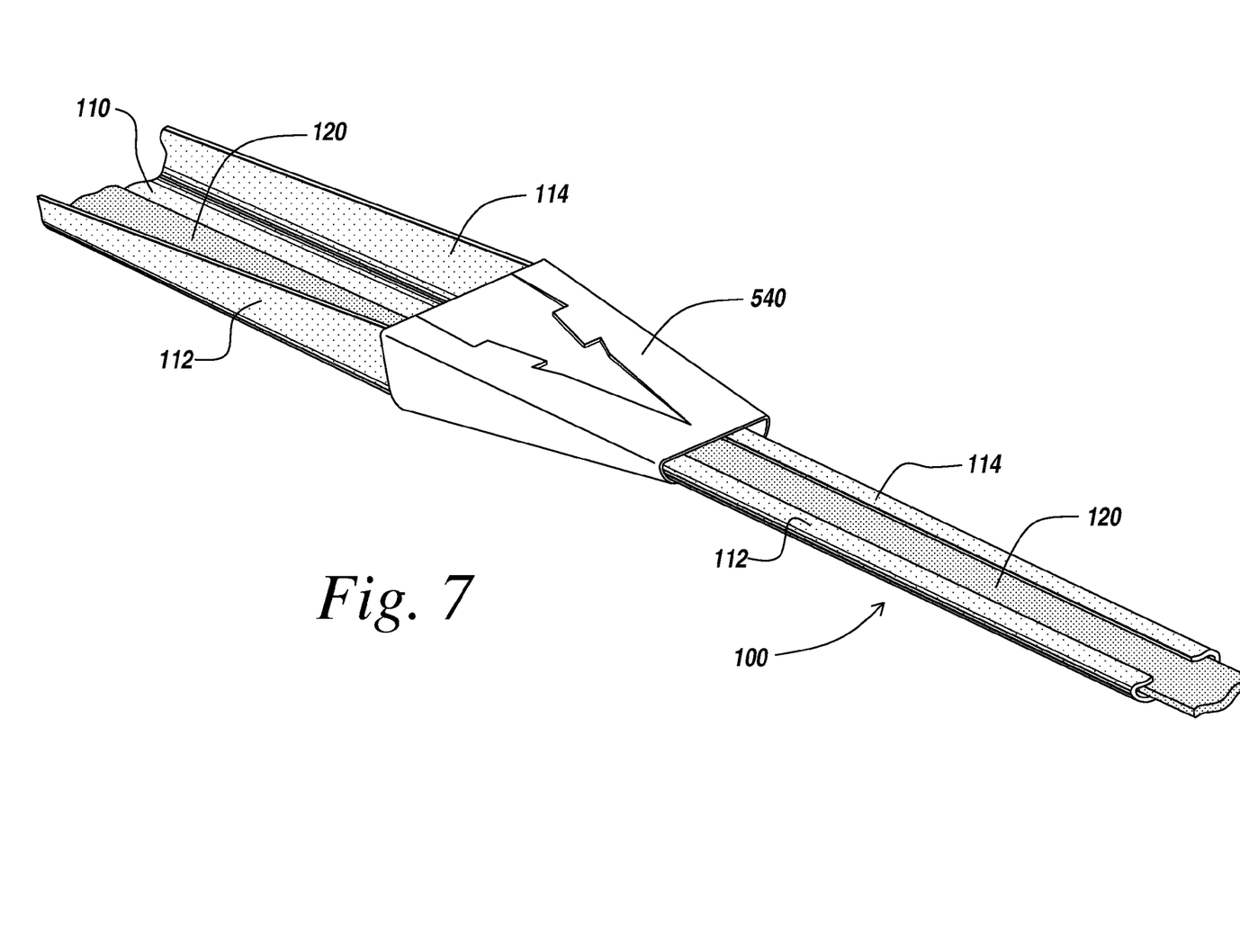
FIG. 7 is a partial exploded perspective view of another stage of the folding process implemented by the mechanical folding system of system of FIG. 5.

FIG. 7 is a partial exploded perspective view of the combination 100 of the first layer 110 and reinforcement layer 120 as it passes through the first folder 540. In this example, the first folder 540 folds the edges 112 and 114 of the first layer 110 up and over the edges 122 and 124 of the reinforcement layer 120. This ensures that the reinforcement layer 120 is substantially coextensive with the first layer 110 to provide maximum support and reinforcement for the first layer 110.

Figure 8:
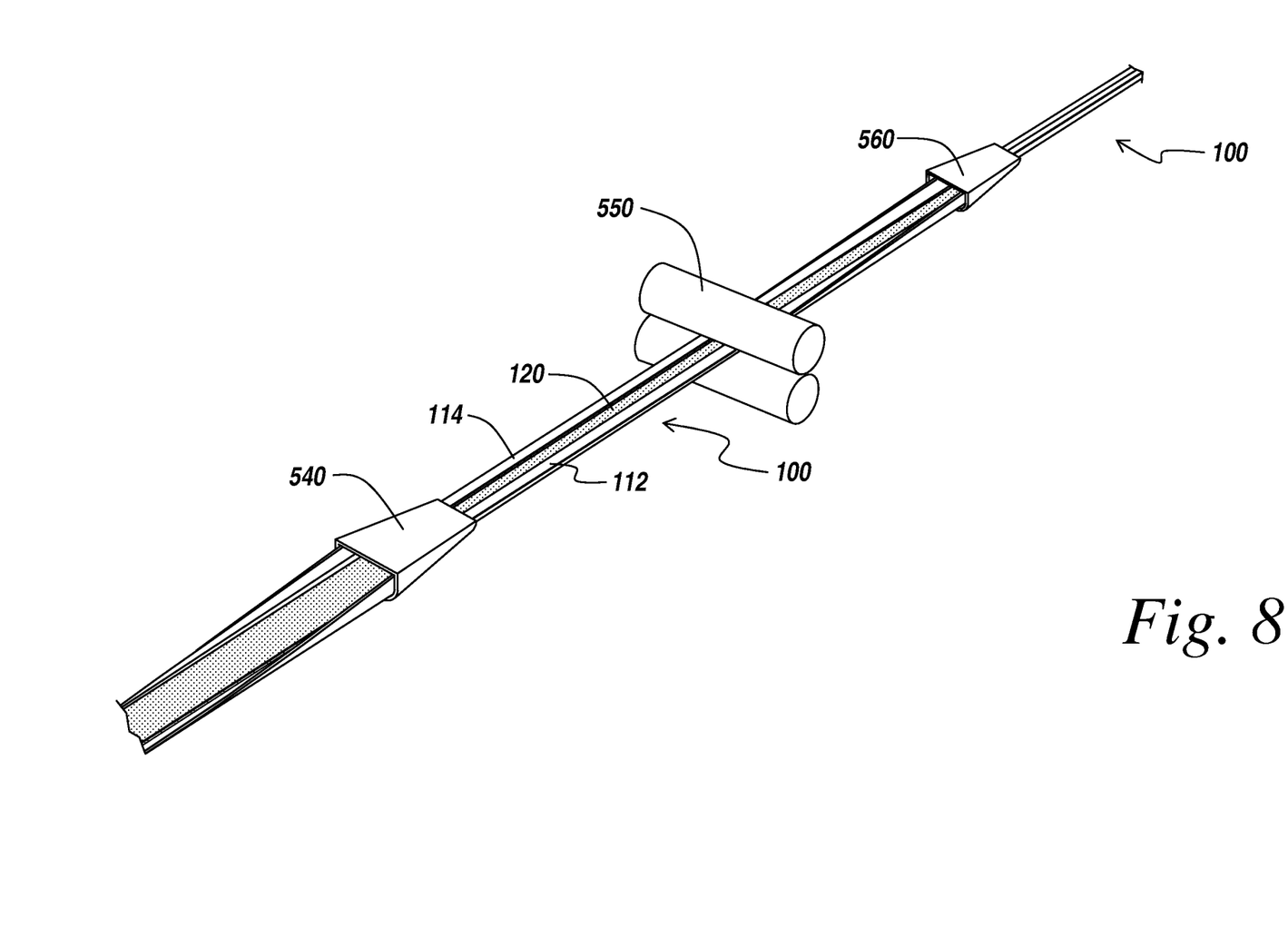
FIG. 8 is a perspective view of another pressing stage of the mechanical folding system of FIG. 5.

After the combination 100 of the first layer 110 and the reinforcement layer 120 emerges from the first folder 540, the combination passes to a second pressing assembly 550. An example of this can be seen in FIG. 8. The second pressing assembly 550 presses the folded-over edges 112 and 114 into the reinforcement layer 120. This ensures that the material of the first layer 110 covers the edges 122 and 124 of the reinforcement layer 120. At this stage, the combination 100 has a cross-section as depicted in FIG. 1B. After emerging from the second pressing assembly 550 the combination 100 of the first layer 110 and reinforcement layer 120 are passed through a second folder 560 that again folds over the edges 122 and 124 of the reinforcement layer 120.

Figure 9:
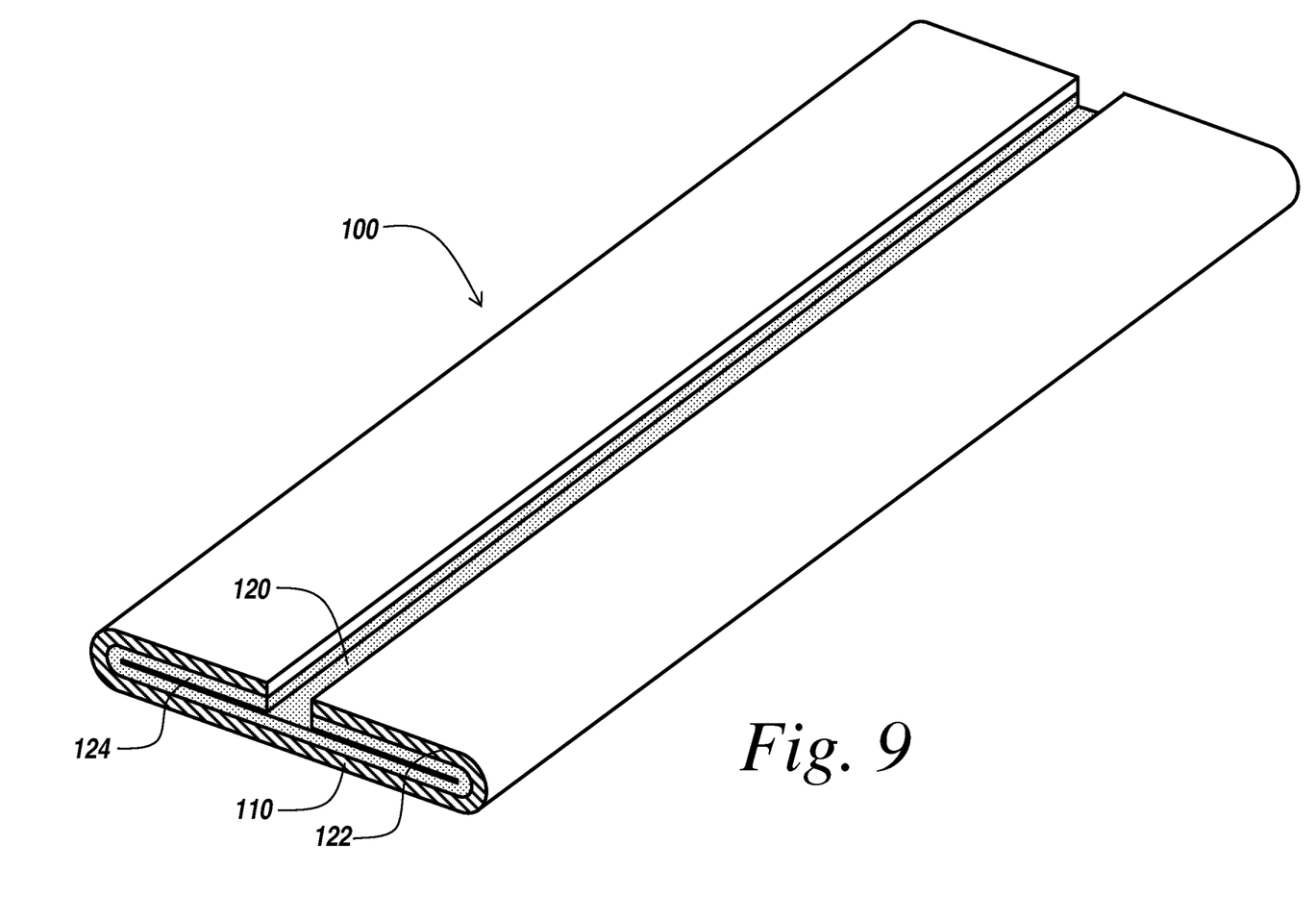
FIG. 9 is a perspective view of the combination of the first layer and reinforcement layer resulting from the pressing and folding stage of FIG. 8.

Referring again to FIG. 5, after emerging from the second folder 560, the combination 100 is passed through a third pressing assembly 570. The third pressing assembly 570 presses the folded-over edges 122 and 124 into the reinforcement layer 120. FIG. 9 is a perspective view of the combination 100 of the first layer 110 and reinforcement layer 120 as it emerges from the third pressing assembly 570. In this example, the first edge 122 and second edge 124 of the reinforcement layer 120 are folded over onto the reinforcement layer 120. As can be seen, the reinforcement layer 120 is substantially coextensive with the first layer 110. At this stage, the combination 100 has a cross-section as depicted in FIG. 1C.

Figure 10:
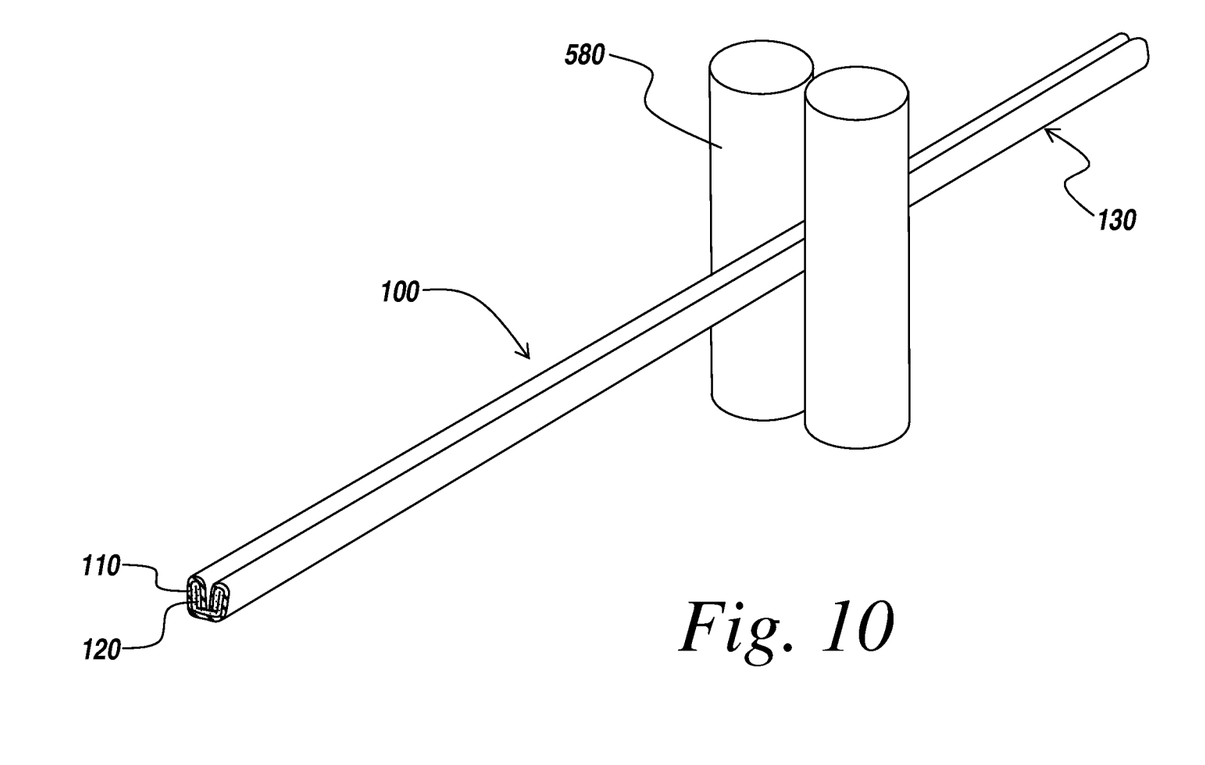
FIG. 10 is a perspective view of the final stage of the mechanical folding system of FIG. 5.

FIG. 10 is a perspective view of the final stage of the machine folding system 500 of FIG. 5. As illustrated, the combination 100 of the first layer 110 and the reinforcement layer 120 are passed through a final pressing assembly 580. The final pressing assembly 580 folds the combination 100 of the first layer 110 and reinforcement layer 120 in half and presses the halves together to form the packing yarn 100 that can be seen in FIG. 2, the cross-section of which is depicted in FIG. 1D.

Figure 11:
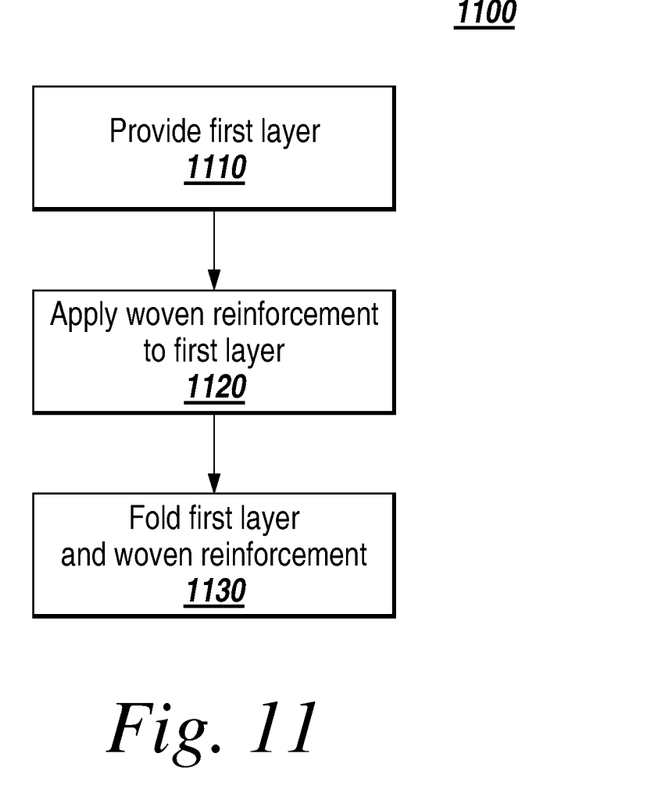
FIG. 11 is a schematic flow chart diagram illustrating a method for manufacturing the packing yarn in accordance with the teachings of the present invention.

FIG. 11 depicts a flow diagram 1100 of one example embodiment of a method for manufacturing the packing yarn of the present invention. The first step is providing the first layer (step 1110). The first layer 110 may be of any of the materials discussed above, sized and dimensioned as necessary. In the example of FIG. 5, the first layer 110 is provided as a film or tape on the first spool 510. The next step of the method is stacking the reinforcement layer 120 on the first layer 110 (step 1120). The reinforcement layer 120 is preferably a non-metal woven material, sized and dimensioned as necessary. In the example of FIGS. 5 and 6, the reinforcement layer 120 is provided as a ribbon of fabric on the second spool 520. As illustrated in FIGS. 5 and 6, the reinforcement layer 120 is stacked on and combined with the first layer 110 by the first pressing assembly 530. The final step of the method includes folding the first layer 110 and reinforcement layer 120 so that the reinforcement layer 120 is substantially coextensive with the first layer 110 (step 1130). One embodiment for the process of folding the first layer 110 and reinforcement layer 120 to form the packing yarn 100 can be seen in FIGS. 5 through 10. Other possible techniques for combining and folding the first layer 110 and reinforcement layer 120 will be apparent to one skilled in the art.

The resulting packing yarn of the present invention overcomes the issues encountered with conventional externally reinforced or internally longitudinally reinforced yarns. The use of a non-metal woven reinforcement provides both longitudinal and lateral strength to the yarn while maintaining the flexibility of the yarn. In addition to the strength provided by the woven reinforcement, the woven nature of the non-metal reinforcement is also less damaging to seal elements if the material of the first layer wears away during use.

Figure 12A:
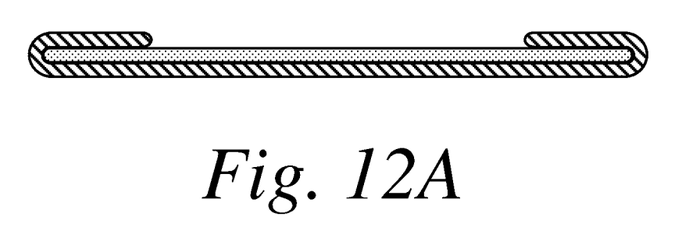
FIG. 12A is a cross-sectional view of another embodiment of the combination of the first yarn layer and the second reinforcement layer in a second stage of folding as shown in FIG. 1B.
Figure 12B:
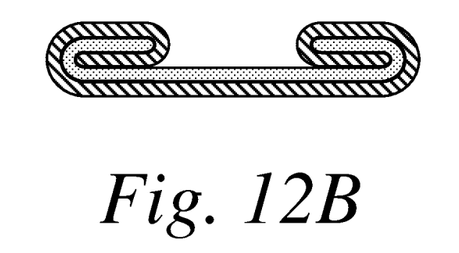
FIG. 12B is a cross-sectional view of another embodiment of the combination of the first yarn layer and the second reinforcement layer in a third stage of folding in FIG. 1C
Figure 12C:
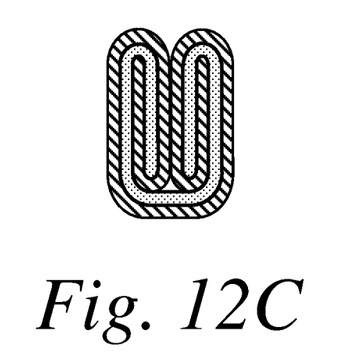
FIG. 12C is a cross-sectional view of another embodiment of the combination of the first yarn layer and the second reinforcement layer in a fourth stage of folding in FIG. 1D.

Alternative folding patterns and techniques may also be employed. Two such alternatives are depicted in FIGS. 12 and 13. In FIG. 12A, first and second layers have been arranged in a similar manner to FIG. 1A, except that the first layer is longer than the second layer to allow the first layer to be initially folded over the second layer to a greater extent. In FIG. 12B, the material is folded in a manner similar to FIG. 1C. As a result of the initial folding, at this step the ends of the second layer are surrounded by the first layer. In FIG. 12C, the structure is again folded in a manner similar to FIG. 1D.

Figure 13A:
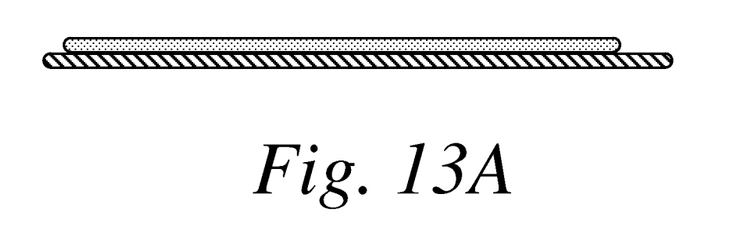
FIG. 13A is a cross-sectional view of yet another embodiment of the combination of the first yarn layer and the second reinforcement layer in a first stage of folding as shown in 1A.
Figure 13B:
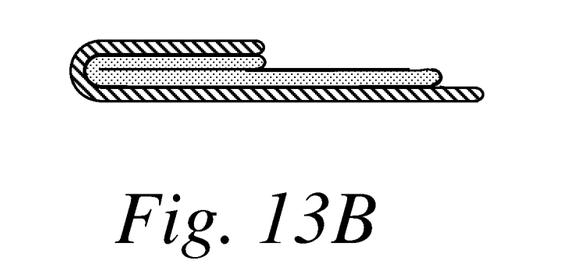
FIG. 13B is a cross-sectional view of yet another embodiment of the combination of the first yarn layer and the second reinforcement layer in a second stage of folding in FIG. 1C
Figure 13C:
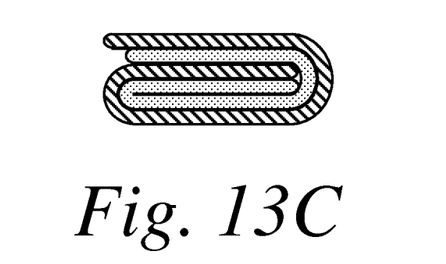
FIG. 13C is a cross-sectional view of yet another embodiment of the combination of the first yarn layer and the second reinforcement layer in a third stage of folding in FIG. 1D.

FIGS. 13A through 13C depict a tri-fold technique. In FIG. 13A, as in FIG. 1A, the first layer and the second layer are substantially coextensive relative to each other. In FIG. 13B, an initial folding operation is performed, such that about one-third of the first and second layers are folded over. In FIG. 13C, the opposite one-third of the first and second layers are folded over the structure, resulting in a tri-fold shape. In this embodiment, as opposed to previously-described embodiments, one end of the second layer may be exposed after the folding process is complete (see, e.g., FIG. 13C). Accordingly, it may be desirable to provide a second layer that is sized and positioned so that the exposed end will not extrude from the yarn. In one embodiment, the first layer is of sufficient size that one end of the first layer can be folded over the exposed end of the second layer.

Figure 14A:
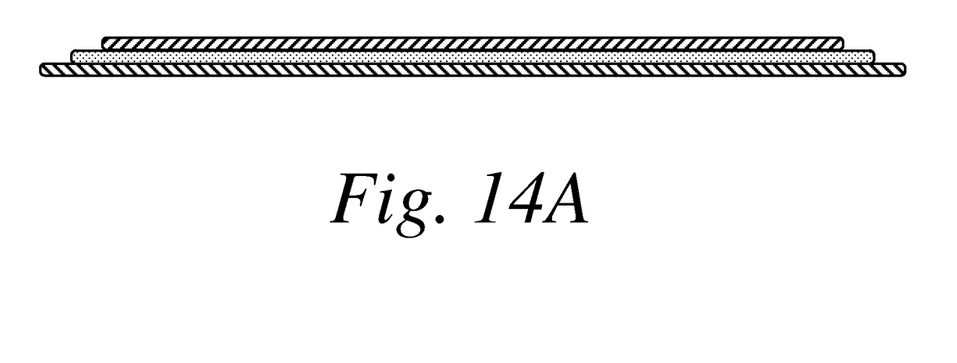
FIG. 14A is a cross-sectional view of still another embodiment of the combination of the first yarn layer and the second reinforcement layer in a first stage of folding as shown in FIG. 1A.
Figure 14B:
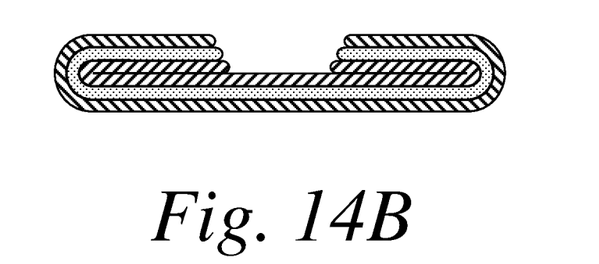
FIG. 14B is a cross-sectional view of still another embodiment of the combination of the first yarn layer and the second reinforcement layer in a second stage of folding in FIG. 1C.
Figure 14C:
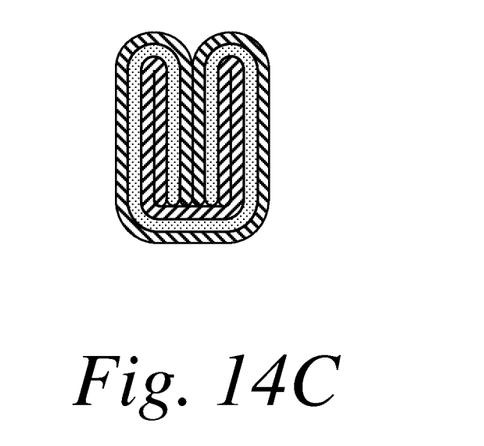
FIG. 14C is a cross-sectional view of still another embodiment of the combination of the first yarn layer and the second reinforcement layer in a third stage of folding in FIG. 1D.

FIGS. 14A through 14C depict yet another embodiment. In this embodiment, as depicted in FIG. 14A, the second layer is sandwiched between the first layer and a third layer. The first and third layer may be formed of substantially the same materials, or may be different materials, depending on the particular application. The second layer is the same as the second layer depicted in FIG. 1. In this embodiment, after the first fold is performed as depicted in FIG. 14B, the third layer is folded over itself so that the second layer remains sandwiched between the first layer and the third layer. After the final fold, as depicted in FIG. 14C, the structure is similar to the structure depicted in FIG. 1D, except that it contains an additional inner layer formed from the third layer.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

It is also to be understood that the following claims are to cover all generic and specific features of the invention described herein, and all statements of the scope of the invention that, as a matter of language, might be said to fall therebetween.

The invention claimed is:

1. A packing yarn, comprising:
   a first layer formed of a first material; and
   a reinforcement layer formed of a non-metal woven material stacked on the first layer, wherein the non-metal woven material of the reinforcement layer comprises a series of lateral supports and a series of longitudinal supports interwoven in a matrix with the series of lateral supports;
   the packing yarn being formed by a combination of the first layer and the reinforcement layer folded laterally together such that the first layer totally covers the reinforcement layer, wherein a mechanical bond is formed as the only securing mechanism by combining the reinforcement layer into the first layer and embedding the woven texture of the reinforcement layer into the first layer,
   wherein the packing yarn has a linear density in the range of about 5,000 denier to about 25,000 denier,
   wherein the first layer has a first bottom planar side and a second top planar side opposed to the first bottom planar side and the reinforcement layer has a first bottom planar side and a second top planar side opposed to the first bottom planar side, and wherein when folded the second top layer of the reinforcement layer directly contacts the second top layer of the reinforcement layer.

2. The packing yarn of claim 1, wherein the first material of the first layer comprises PTFE.

3. The packing yarn of claim 2, wherein the PTFE comprises graphite impregnated expanded PTFE.

4. The packing yarn of claim 1, wherein the first material of the first layer comprises graphite.

5. The packing yarn of claim 1, wherein the non-metal woven material of the reinforcement layer comprises fiberglass.

6. The packing yarn of claim 1, wherein the non-metal woven material of the reinforcement layer comprises carbon/graphite.

7. The packing yarn of claim 1, wherein the non-metal woven material of the reinforcement layer comprises aramid and its various forms.

8. The packing yarn of claim 1, wherein the reinforcement layer is substantially co-extensive with the first layer when the first layer and reinforcement layer are folded together.

9. The packing yarn of claim 1, wherein the reinforcement layer has a minimum tensile strength of at least about 5 lbs in the longitudinal (warp) direction and at least about 2.5 lbs in the transverse (fill) direction using ASTM D5035 as a test method.

10. The packing yarn of claim 1, wherein the reinforcement layer has both a longitudinal tensile strength and a lateral tensile strength of at least about 12 lbs.

11. The packing yarn of claim 1, wherein the packing yarn comprises only the first layer and the reinforcement layer and is free of an adhesive layer.

* * * * *